May 31, 1960 T. A. REPPER 2,938,310
JIG MOUNTING FOR SHARPENING ROTARY SCRAP CUTTERS
Original Filed Dec. 30, 1953 2 Sheets-Sheet 1
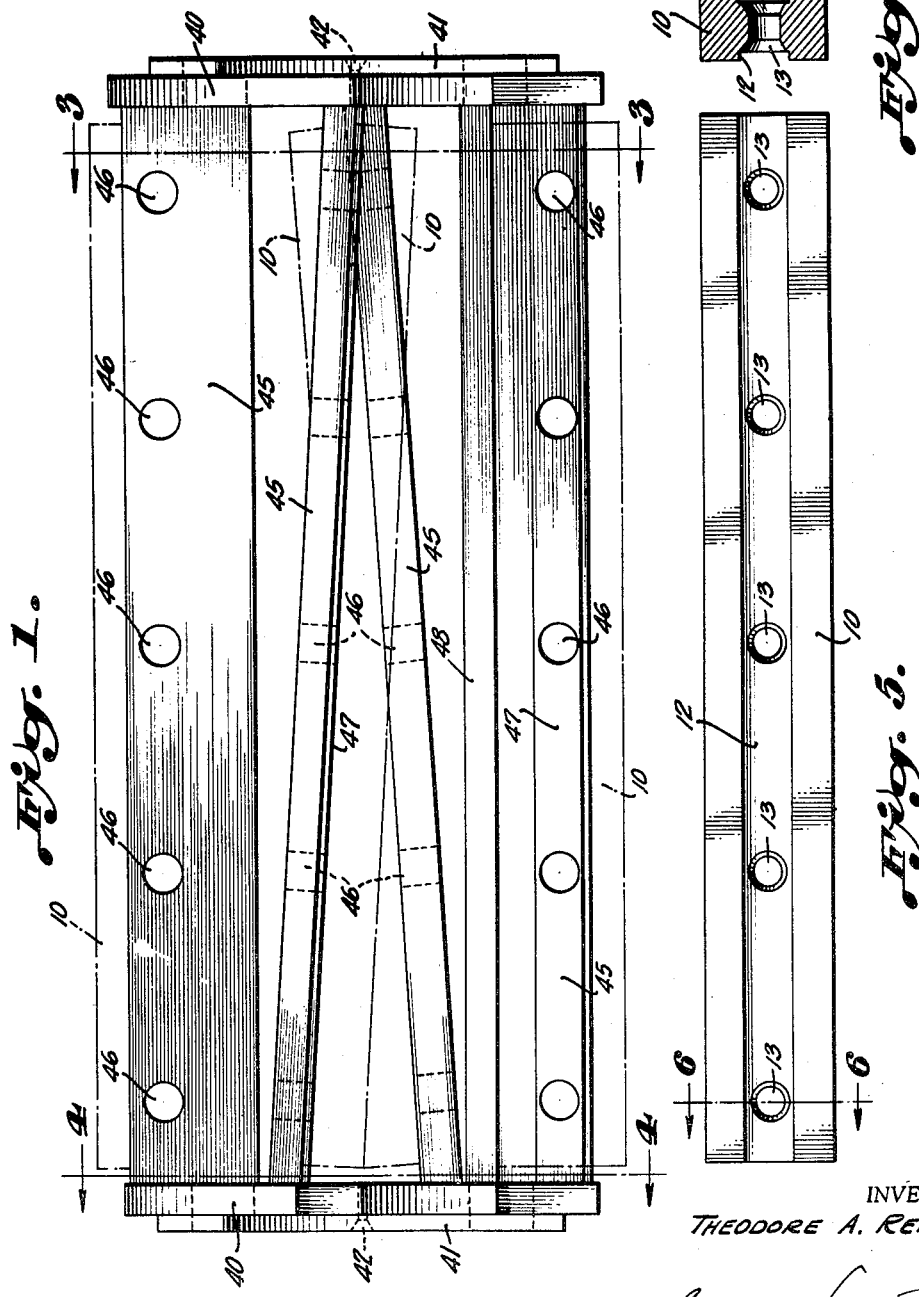
INVENTOR
THEODORE A. REPPER
BY
ATTORNEY

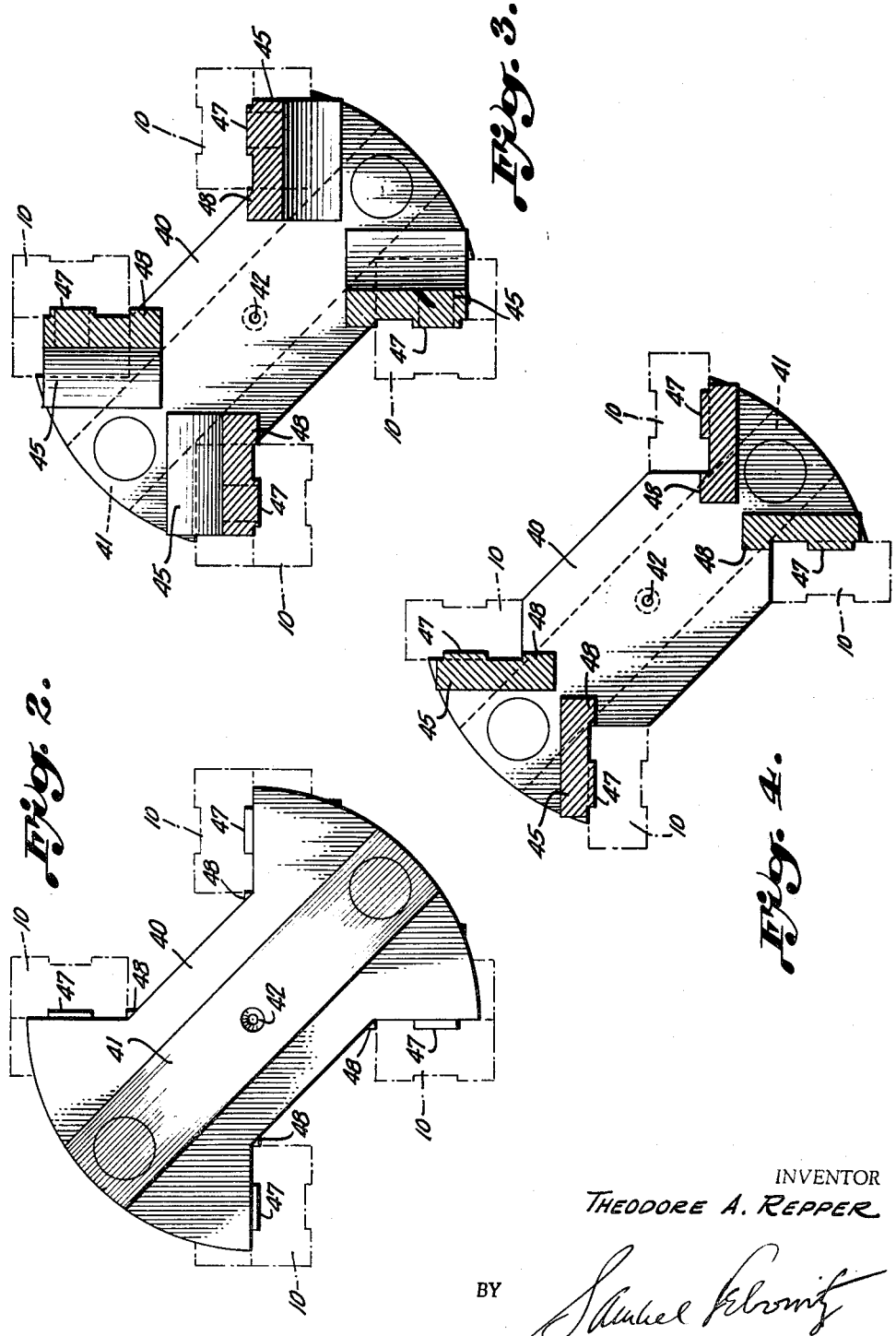

United States Patent Office 2,938,310
Patented May 31, 1960

2,938,310

JIG MOUNTING FOR SHARPENING ROTARY SCRAP CUTTERS

Theodore A. Repper, 8 Aberdeen Place, Middletown, Ohio

Original application Dec. 30, 1953, Ser. No. 401,200, now Patent No. 2,814,345, dated Nov. 26, 1957. Divided and this application Sept. 30, 1957, Ser. No. 687,266

3 Claims. (Cl. 51—218)

This invention relates to a jig mounting for sharpening rotary scrap cutters of the type employed for cutting into small pieces the side trimmings from a sheet of metal to eliminate the twisting of these trimmings as the sheet of metal travels continuously in the course of edge finishing operations.

This application is a division of my application Serial No. 401,200, filed December 30, 1953 and entitled "Rotary Scrap Cutters," Patent No. 2,814,345, November 26, 1957.

It is a primary object of the invention to provide an improved sharpening arrangement for detachable cutters adapted to be mounted on a rotary cutter shaft or arbor, which are capable of easy interchangeability and which cooperate with a stationary cutter bar in a manner to perform a progressive cut on the material being fed between the cutting edges. This progressive cut is attained by virtue of the angular disposition of the rotary cutter bars relative to the axis of the rotary shaft, resulting in a drawing cut upon the material which may be executed easily even on heavy gauge sheets, for example ⅜" stock.

The invention is concerned with the sharpening of special cutter bars adapted to be mounted on a rotary shaft angularly with respect to the axis of the shaft.

The instant invention is concerned with a jig mounting in which the cutter bars of substantially rectangular cross-section are mounted on bar frames of a size corresponding to the rotary shaft or arbor of the cutting mechanism so that the cutting edges may be ground in conformity to the cutting surfaces sought to be attained when the cutter bars are in operative position in the scrap cutting machine.

Other objects and purposes will appear from the detailed description of the invention following hereinafter, taken in conjunction with the accompanying drawings, wherein:

Fig. 1 is a front elevation of a rotary jig for mounting the cutter bars in position for sharpening the multiple edges thereof;

Fig. 2 is a right end view of the jig shown in Fig. 1;

Fig. 3 is a vertical sectional view along line 3—3 of Fig. 1;

Fig. 4 is a vertical sectional view along line 4—4 of Fig. 1;

Fig. 5 is a front elevation of a cutter bar in accordance with the invention; and Fig. 6 is a vertical sectional view along line 6—6 of Fig. 5.

The cutter bars 10 in accordance with the instant invention, which are shown in Figs. 5 and 6, are originally of substantially rectangular cross-section and are channeled along the centers of the opposite faces at 12. These channels selectively seat upon medial projections 47 extending longitudinally of the seating bars 45 which extend between the end plates 40 of the jig shown in Figs. 1 to 4, which mount four of the cutter bars to grind the peripheral surfaces thereof convexly, thereby producing two cutting edges simultaneously for each of the cutter bars.

This jig is formed of end plates 40 backed by bars 41 provided with center holes 42. The bars 45, having medial and end projections 47 and 48, extending longitudinally and equidistantly between the end plates, serve to seat securely the cutter bars at the intermediate channels 12 as well as at the ends thereof with the aid of a plurality of bolts extending through openings 46 in the several seating bars and countersunk openings 13 in the cutter bars 10. As shown in Figs. 1 to 4, the seating bars 45 seat four cutter bars, indicated in dotted lines, at equidistant intersecting center lines with a uniform inclination with respect to the longitudinal axis of the rotary jig or support. The bars 45 are disposed radially and angularly with respect to the longitudinal axis of the jig with the same inclination as the seats for the cutter bars assume in the course of operation of the rotary shaft which support the cutters in their operative cutting position. The rotation of the jig with respect to a grinding wheel results in a sharpening of the edges of the cutter bars 10. Thus, the cutting edges of the cutter bars are sharpened along lines identical to those encountered by them in their cooperative functioning with the cutting edge of a stationary rectilinear cutting bar.

As may be seen in the drawings, each cutter bar 10 is straight with its central part overlying the longitudinal axis of the jig between centers 42 so that a common plane contains the last-mentioned axis, a radius extending perpendicularly from said axis and the mid-portion of the longitudinal axis of the cutter bar. The ends of each cutter bar lead and lag its central portion, so that if the cutter bars are ground upon a common surface of revolution, the section of each cutter bar varies gradually from end to end with the cutting edge at one end forming an acute angle while the cutting edge adjacent the opposite end of the cutter bar forms an obtuse angle with a symmetrical section of the exposed edges existing only at the center of the cutter bar. This makes possible the interchanging of the cutting edges so that in every case an effective drawcut is obtained for each of the four edges produced by grinding the opposite peripheral faces thereof.

While I have described my invention as embodied in a specific form and as operating in a specific manner for purposes of illustration, it should be understood that I do not limit my invention thereto, since various modifications will suggest themselves to those skilled in the art, without departing from the spirit of my invention, the scope of which is set forth in the annexed claims.

I claim:

1. A rotary jig for supporting a plurality of rigid cutter bars of substantially rectangular cross-section for rapid rotary movement relative to a grinding wheel adapted to cooperate with the peripheral face of each of said cutter bars to produce simultaneously two convexly ground cutting edges on each of said bars, comprising centering means at the opposite ends of said jig for the mounting thereof for rapid rotary movement around the axis of said centering means, a plurality of fixed seating bars extending angularly to said axis and spaced equidistantly radially therefrom, and means for fastening a cutter bar to each of said seating bars in fixed position relative to the central longitudinal axis of said jig so that the ends thereof terminate in planes including the radii of said rotary jig which lead and lag with respect to the plane containing the radius to the midportion of said cutter bar, the outermost faces of said cutter bars forming part of a common surface of revolution to produce a convex cutting edge section which is unsymmetrical with respect to the inoperative exposed edge section at the opposite corner of said cutter bar except at said midportion thereof.

2. A rotary jig as set forth in claim 1 wherein the plurality of seating bars are four in number and arranged equidistantly at intersecting center lines of said jig with a uniform angular inclination with respect to the longitudinal axis of said rotary jig.

3. A rotary jig as set forth in claim 1 wherein a pair of end plates are provided at the opposite ends of said rotary jig for supporting the opposite ends of each of said seating bars, and said centering means are in the form of center holes formed in the external faces of said end plates.

References Cited in the file of this patent

UNITED STATES PATENTS

| | | |
|---|---|---|
| 1,356,737 | Ramstetter et al. | Oct. 26, 1920 |
| 1,834,972 | Satterstrom | Dec. 8, 1931 |